United States Patent [19]

Courtney et al.

[11] Patent Number: 4,871,226
[45] Date of Patent: Oct. 3, 1989

[54] MOUNTING OF OPTICAL FIBERS TO INTEGRATED OPTICAL CHIPS

[75] Inventors: Daniel P. Courtney, Wilbraham; Timothy J. Bailey, Longmeadow, both of Mass.

[73] Assignee: United Technologies Corporation, Hartford, Conn.

[21] Appl. No.: 103,325

[22] Filed: Oct. 1, 1987

[51] Int. Cl.$^4$ .............................................. G02B 6/30
[52] U.S. Cl. ............................. 350/96.17; 350/96.11; 350/96.15
[58] Field of Search ............... 350/96.10, 96.15, 96.17, 350/96.18, 96.20, 320, 96.11; 250/227, 552; 357/17, 19, 30, 74, 80; 156/166, 297, 293, 304.2

[56] References Cited

U.S. PATENT DOCUMENTS

| | | | |
|---|---|---|---|
| H 750,800 | 6/1988 | Fournier et al. | 350/96.11 |
| 4,445,751 | 5/1984 | Divens et al. | 350/96.17 X |
| 4,474,429 | 10/1984 | Yoldas et al. | 350/96.17 X |
| 4,487,475 | 12/1984 | Ogawa | 350/96.21 |
| 4,500,165 | 2/1988 | Scholl et al. | 350/96.20 |

OTHER PUBLICATIONS

R. S. Weis and T. K. Gaylord, "Lithium Niobate: Summary of Physcial Properties and Crystal Structure", Appl. Phys. A 37, pp. 191–203 (1985).
A. C. G. Nutt et al, "Fiber-to-Waveguide Coupling Using Ion-Milling Grooves in Lithium Niobate at 1.3 um Wavelength", Journal of Optical Letters, vol. 9, No. 10, pp. 463–465 (Oct. 1984).
E. J. Murphy et al, "Permanent Attachment of Single-Mode Fiber Arrays to Waveguides", Lightwave Tech., vol. LT-3, No. 4, pp. 795–798 (Aug. 1985).
H. C. Lefevre et al, "Progress in Optical Fiber Gyroscopes Using Integrated Optics," Guided Optical Structures in the Military Environment, AGARD-CP-383, Instanbul, Turkey, Sep. 23–27, 1985, pp. 9A-1-(A-13, (Agard, May, 1986).
R. Rao and J. S. Cook, "High Return Loss Connector Design Without Using Fiber Contract or Index Matching", Electronics Letters, vol. 22, No. 14, pp. 731–732 (Jul. 1986).
"Progress in Optical Fiber Gyroscopes Using Integrated Optics", by H. C. Lefevre et al.

Primary Examiner—William L. Sikes
Assistant Examiner—Phan T. Heartney
Attorney, Agent, or Firm—Francis J. Maguire, Jr.; Charles E. Sohl

[57] ABSTRACT

A fiber carrier provides an effective coupling means between a cleaved facing surface of an optical fiber and a light port in a mounting surface of an integrated optical device. Both the fiber carrier and the integrated optical device have an anisotropic thermal expansion property along the same known optic axis and both are substantially similar in magnitude to each other. The fiber carrier is positioned with the integrated optical device so that both the carrier optic axis is parallel to the device optic axis and so that an auxiliary surface of the carrier is parallel to the device mounting surface. The optical fiber is then bonded to the fiber carrier so that the plane of the optical fiber cleaved facing surface lies in the plane of the carrier auxiliary surface. The carrier auxiliary surface is finally bonded to the device mounting surface so that the optical fiber cleaved facing surface is placed in registration with the light port in the device mounting surface.

6 Claims, 2 Drawing Sheets

MOUNTING OF OPTICAL FIBERS TO INTEGRATED OPTICAL CHIPS

TECHNICAL FIELD

This invention relates to the mounting optical fibers to integrated optic chips.

BACKGROUND ART

The term "integrated optics" refers to a class of devices for guiding and controlling light in thin film layers or in narrow waveguide channels formed in a suitable dielectric material. The integrated optic (I/O) devices can be either of a single type including transducers, filters, modulators, memory elements, and others or of several functional applications combined ("integrated") onto a single device.

Although several materials have been used for I/O device fabrication, one of the most widely used I/O device materials is lithium niobate. Lithium niobate is used primarily because of its optical and electro-optical properties. At room temperature, the atomic structure of lithium niobate belongs to the rhombohedral (trigonal) space group R3c and where the point group is 3 m. This formula for lithium niobate is stable up to the ferroelectric transition around 1200° C., where a transition to the nonpolar point group 3 m occurs. Crystallagraphers can measure parameters for lithium niobate as either a hexagonal or a rhombohedral unit cell. When measured as a rhombohedral unit cell, the atomic structure of lithium niobate exhibits an interaxial angle of approximately 56° and a unit cell axis length of approximately 5.5 angstroms. As a hexagonal unit cell, the atomic structure of lithium niobate has a unit cell axis length (a=b) of approximately 5.5 angstroms and a c axis length of approximately 13.8 angstroms. For purposes of this application the hexagonal unit cell shall be used to define the atomic structure of lithium niobate.

Furthermore, lithium niobate is characterized by having a large pyroelectric (i.e., spontaneous polarization of the crystal as a function of temperature), piezoelectric (i.e., induced polarization as a function of applied stress), photo-elastic (i.e., change in refractive index as a function of applied stress), and electro-optic (i.e., change in refractive index as a function of applied electric field) properties. It is also birefringent (i.e., linearly polarized electromagnetic waves will travel at two different velocities and along two perpendicular principal displacement directions) and exhibits a very strong bulk photovoltaic effect which also can produce a significant photo-refractive effect (i.e., change in refractive index as a function of the change in the optical intensity of the propagating light). See R. S. Weis and T. K. Gaylord: Appl. Phys. A37, P. 191–203 (1985).

With all these optical and electro-optical properties, lithium niobate has found widespread application in laboratory and experimental systems. However, in order to make practical use of lithium niobate as an integrated optic device, numerous material problems still require solutions. One such problem is that lithium niobate devices still require a coupling device between themselves and optical fibers which functions over a wide range of environments (i.e., shock, vibration, and temperature). This inability to develop an environmentally stable coupling device stems from lithium niobate's strong anisotropic thermal expansion properties and from movement between the waveguide and the optical fiber. A strong anisotropic thermal expansion property means that the dimensional changes in the material associated with a temperature change differs in different directions in the crystal. Lithium niobate exhibits a thermal expansion property along the Z-axis (the Z-axis being defined as the axis about which the crystal exhibits three-fold rotation symmetry) in the range between $2 \times 10^{-6}$/°C. to $7.5 \times 10^{-6}$/°C. (Note: the variations being due to the various investigators' use of different materials, measurement techniques and over different temperature ranges), while the thermal expansion in the isotropic X or Y axes are in the range between $14 \times 10^{-6}$/°C. to $17 \times 10^{-6}$/°C. Since in practical military applications where the integrated optic device must survive temperature fluctuations between $-40°$ C. to $+80°$ C., the anisotropic thermal expansion property of both the integrated optic device and the coupling device must be substantially similar to maintain the bond between them. Movement between the optical fiber and the waveguide occurs primarily because of the environment in which the integrated optic device is used along with the anisotropic thermal expansion property of lithium niobate In a gyroscope system, for example, the integrated optical device will have one degree of freedom which will sustain a substantial amount of the shock occurring along that axis while all three axes will undergo vibration. Since the light wavelength in many state of the art military applications is at the 850 nanometer range, the outside maximum allowable movement between the waveguide core with respect to the optical fiber core or vice versa is only 0.5 microns Any movement beyond this narrow tolerance causes totally unacceptable distortion to the output signal.

Despite these obstacles, several attempts at developing an environmentally stable coupling device for 850 nanometer optical fiber have been attempted One such attempt used ion milled grooves in the lithium niobate device which permitted the rigid location of a chemically etched and polished optical fiber. This approach had alignment grooves which were defined by conventional photolithography and which were fabricated using ion milling in the same substrate as the waveguide. The coupling of the optical fiber to the waveguide was performed by inserting and bonding an etched portion of an optical fiber into the ion milled groove. Hence, the light emerging from the etched fiber went directly into the waveguide. See A. C. G. Nutt et al: Optics Letters, Vol. 9, No. 10, P. 463–465 (Oct. 1984). Although a good approach, this attempt had several shortcomings. First, the ion milling of the grooves in the waveguide and the etching of the optical fibers was a slow, expensive, and time consuming process requiring great precision which allowed for potential alignment problems between the waveguide and the optical fiber Second, the etching of the fibers greatly reduces the polarization maintenance properties (i.e., stress zones) of the optical fibers which may exclude the use of birefringent optical fibers. Third, this approach was never actually demonstrated over a wide temperature range or for use with low loss connectors.

Another attempt at providing a temperature stable coupling device was the use of silicon V-grooves. Optical fibers were prepared by epoxying single-mode fibers into V-grooves etched onto a silicon chip. A silicon chip cover was then mated with the silicon chip containing the etched V-grooves so that the optical fiber cores were precisely and periodically spaced along a straight line. After this assembly of the silicon chip, the end faces of the optical fibers were polished, butt coupled to a corresponding lithium niobate waveguide, aligned, and then attached using an optical adhesive. See E. J. Murphy et al: J. of Lightwave Tec., Vol. LT-3, No. 4, P. 795-798 (Aug. 1985). Although this approach allowed multiple optical fiber mountings to the waveguide, it also had problems. First, the silicon V-groove chip required very great accuracy and precision in the etching of the V-grooves in order to allow for the correct alignment of the optical fiber cores to the waveguide core. Second, the silicon V-groove approach could only effectively use single mode optical fiber with a 1300 nanometer wavelength or the 850 nanometer wavelength with reduced performance. This approach has never been demonstrated using either polarization maintaining optical fibers or optical fibers at the 850 nanometer wavelength. Third, the silicon V-groove chip is relatively large in physical size. Finally, the silicon V-grooved chip and the integrated optical device have different thermal expansion properties. Hence, at the silicon-lithium niobate interface, a substantial thermal mismatch exists which can result in thermal instabilities which could destroy the bond between optical fiber and the waveguide.

It should be noted at this point that the coordinate system used to describe the physical tensor properties of lithium niobate is neither hexagonal nor rhombohedral but rather an X-Y-Z Cartesian coordinate system. Lithium niobate exhibits an anisotropic thermal expansion coefficient along an optical or C-axis and an isotropic thermal expansion coefficients along the other two axes. A light beam projected along the optic axis has the same refractive index regardless of the polarization of light and hence light propagating along this axis is said to be "symmetric". Accordingly, the optic axis which is usually assigned to the Z-axis can be easily determined. The sense of the Z-axis is the same as that of the optic axis. (i.e., upon compression the $+Z$ face becomes negatively charged because of the piezoelectric effect.) As stated earlier in this background art section, lithium niobate has an atomic structure which can be described as a conventional hexagonal unit cell. According to the standard definition for a hexagonal unit cell, a hexagonal unit cell has three coplaner axes, called $a_H$ axes, 120° apart from each other and equal in magnitude to each other along with a fourth axis, called a C-axis or in the case of lithium niobate the optic axis, which is at right angles to the three $a_H$ axes. Also, optic axis of lithium niobate lies in three mirror planes of symmetry about which any charge movement on one side of the plane is "mirrored" by movement on the other side. These three mirror planes of symmetry are also perpendicular to the $a_H$ axes. The X-axis is chosen to coincide with any of the $a_H$ axes and, since a right-handed cartesian coordinate system is used, the Y-axis lies in a plane of mirror symmetry. The sense of the Y-axis is determined in a manner similar to that described for the Z-axis. (I.e., upon compression, the $+Y$ face becomes negatively charged because of the piezoelectric effect.) The sense of the X direction, however, cannot be determined in this way because the X-axis is perpendicular to a mirror plane. Any charge movement on one side of the plane is "mirrored" on the opposite side, hence, the X faces do not become charged.

Typically, suppliers of lithium niobate crystals furnish pieces that are commonly in the form of thin slabs. These thin slabs may be designated X-cut, Y-cut, or Z-cut respectively, to the X, Y, or Z axes being normal to the broad face of the slab. A second letter is often added to the slab orientation indicating the direction of the propagation of light through a waveguide within the slab. Thus, an "X-cut, Y-propagation" describes a device having the X-axis normal to the broad face and the Y-axis in the direction in which light propagates within the waveguide.

DISCLOSURE OF THE INVENTION

An object of the present invention is to provide an effective coupling device between lithium niobate devices and optical fibers for operation over a temperature range between $-40°$ C. to 80° C.

Another object of the present invention is to provide an effective coupling device between lithium niobate devices and optical fibers which is more resistant to shock.

Still another object of the present invention is to provide an effective coupling device between lithium niobate devices and optical fibers which is more resistant to vibration.

According to the present invention, a fiber carrier provides an effective coupling means between a cleaved facing surface of an optical fiber and a light port in a mounting surface of an integrated optical device. Both the fiber carrier and the integrated optical device have an anisotropic thermal expansion property along the same known optic axis. Both the fiber carrier's and the integrated optical device's anisotropic thermal expansion property are also substantially similar in magnitude to each other. The fiber carrier is positioned with the integrated optical device so that both the carrier optic axis is parallel to the device optic axis and so that an auxiliary surface of the carrier is parallel to the device mounting surface. The optical fiber is then bonded to the fiber carrier so that the plane of the optical fiber cleaved facing surface lies in the plane of the carrier auxiliary surface. The carrier auxiliary surface is finally bonded to the I/O device mounting surface so that the optical fiber cleaved facing surface is placed in registration with the light port in the I/O device mounting surface.

In further accord with the present invention, the mounting surface of the fiber carrier is aligned with the mounting surface of the I/O device such that the optic axis of the fiber carrier is the only one of three orthogonal axes which is parallel to the three orthogonal axes of the I/O device. For example, both the auxiliary surface of the fiber carrier and the mounting surface of the I/O device are cleaved at an angle other than 90° with respect to the propagation of light to reduce the backreflection of light and any Fabry-Perot interferometer effects at the optical fiber-waveguide interface. The angle formed in the fiber carrier by cleaving is usually different from the angle formed in the I/O device by cleaving. However, in certain applications, both the angle in the fiber carrier and the angle in the I/O device can be the same.

The present invention represents an advancement over prior devices which attempted to couple optical fibers to lithium niobate devices for several fundamental reasons. First, the integrated optic device and the fiber carrier are both forged from lithium niobate or other substantially similar materials which will reduce the thermal mismatch and hence stress on each because both now have substantially similar thermal expansion properties. Second, the present invention has been proved successful using optical fibers that are single mode at the 850 nanometer wavelength. According to the latest test results, optical fibers having a straight cleaved surface have a fiber-to-fiber throughput loss due to all causes of about −1 db. This −1 db loss mainly being due to a Fabry-Perot effect at the higher temperature ranges which would not be present in a best mode embodiment which both the mounting surface of the substrate and the auxiliary surface of the carrier are cleaved at an angle other than 90°. Third, unlike the prior attempts at a coupling device, the present invention is simple to manufacture because it requires no critical tolerances or special manufacturing techniques. Hence, numerous lithium niobate fiber carriers can be easily, cheaply and quickly manufactured from a single lithium niobate wafer using only a cutting device. Fourth, the present invention allows for the active alignment and realignment of the optical fiber core to the waveguide port by projecting light through the fiber core—waveguide port interface and then manually realigning the fiber core to achieve maximum light throughput. This active alignment process is quite unlike the prior art which relied on special manufacturing techniques (i.e., etching and milling) with critical and narrow tolerances to achieve alignment between the fiber core and the waveguide port. Fifth, the fiber carrier of the present invention is a component having a very low mass and hence this device is more resistant to shock and vibration than any in the prior art. Finally, the present invention can be used with polarization maintaining fibers because nothing is done to the cladding of the optical fiber which could effect the stress zones or the elliptical inner core of these polarization maintaining fibers.

It should be understood that although the invention has been disclosed in terms which closely follow the convention previously established in the art for describing crystalline axes, other conventions are of course possible. The invention should in no way be limited by the constraints of the nomenclature used herein. Similarly, although it is conventional in the art to provide I/O device substrates cut along axes chosen according to the conventional nomenclature, such I/O devices could be provided to cut along axes dictated by other systems of nomenclature. Thus, it will be understood that many different shapes and sizes of I/O devices can be utilized according to the present invention. It will also be understood that the orientation of the crystalline structure of the I/O device with respect to the outside shape provided is of little importance to the implementation of the present invention, properly understood. Each variation in shape of the I/O device can easily be matched by fabricating fiber carriers having the same axial alignment of their atomic structure as the I/O device when both the I/O device and the fiber carrier are mated together.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
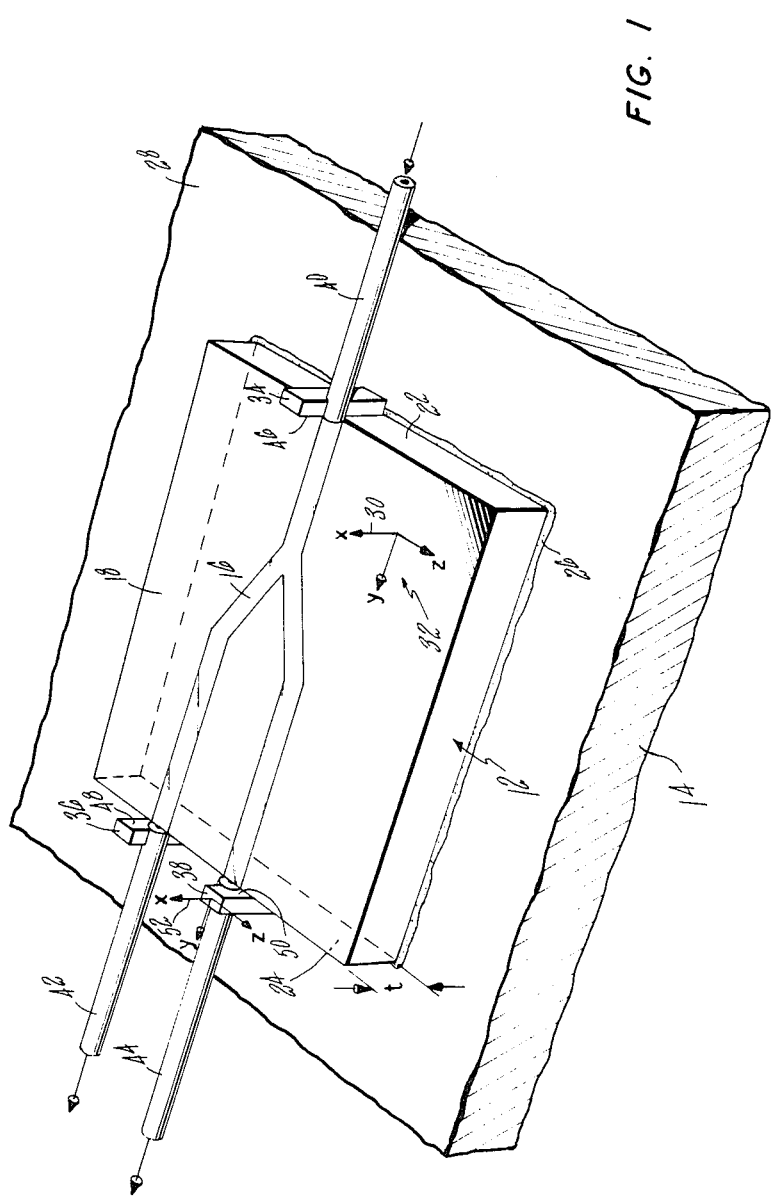
FIG. 1 is a perspective illustration of one embodiment according to the present invention showing several fiber carriers mounted onto an I/O device.

FIG. 1, which is not drawn to scale, illustrates several fiber carriers mounted onto an I/O device, according to the present invention. An I/O device 12 is bonded to a substrate 14. For illustrative purposes, an I/O device consisting of a simple "Y" shaped optical waveguide in LiNbO$_3$ is shown. The I/O device consists of a waveguide 16 formed within a crystal surface 18 which is spaced at a crystal thickness (t) from a crystal mating surface (not shown) and two device mounting surfaces 22 and 24 containing ports of the waveguide 16 (not shown). The waveguide can be formed by means well known in the art, such as, proton exchange or titanium indiffusion. The crystal mating surface is then bonded along a seam 26 to a mounting surface 28 of the substrate 14. The substrate 14 is chosen to have a material which has the same or a substantially similar anisotropic thermal expansion property aligned with the identical or similar axis of the I/O device 12.

The I/O device 12 has a crystal thickness (t) of approximately 1.0 millimeter with the length and width selected for the particular application. The illustrated I/O device 12 is an "X-cut, Y-propagation" crystal, which by convention, means that the X-axis 30 of the chip in the Cartesian coordinate system 32 is normal to the crystal cut surface 18. Also by convention, the direction in which the waveguide lies is identified by a Cartesian coordinate axis parallel to it. Hence, the device is designated a "Y-propagation" which means the Y-axis lies parallel to the waveguide.

The fiber carrier material is chosen having the same or a substantially similar anisotropic thermal expansion property along the same optic axis as that of the I/O device. After choosing the fiber carrier material, a wafer having the substantially similar thermal expansion properties (both anisotropic and isotropic) in the same axes of the same coordinate system as those of the I/O device is obtained. For example, if the I/O device chosen were a "Z-cut, Y-propagation" device, then the wafer obtained to made the fiber carriers would also have to be "Z-cut, Y-propagation". A mounting surface of the wafer is then securely bonded to a glass plate and the joined wafer-glass plate is mounted on a cutting device so that the wafer surface opposite the mounting surface, called the major surface, faces the cutting device. A cleaving cut, which allows for the eventual mating of the optical fiber to the fiber carrier, is made in a straight line along the major surface of the wafer. Numerous cleaving cuts are then made in straight regularly spaced lines along the major surface of the wafer. The spacing interval between these cleaving cuts on the wafer is dependent on the size and shape of the fiber carrier chosen while the shape and depth of these cleaving cuts correspond to the clad radius of the optical fiber. The blade in the cutting device is then replaced usually with a thicker model. Separating cuts, which subdivide and separate the individual fiber carriers, are then made both horizontally and vertically along regularly spaced intervals. Again, the spacing interval between the separating cuts are dependent upon the size and shape of the fiber carrier chosen while the depth of these separating cuts goes into but not through the glass plate. Finally, the bonding between the cut wafer and the glass plate is removed through the use of heat or a solvent which leaves the newly minted fiber carriers.

In the embodiment of FIG. 1, therefore, each of the fiber carriers 34, 36, and 38 are "X-cut, Y-propagation" devices as designated in FIG. 1 by an X-axis 52 being a selected crystal axis and parallel to the X-axis 30 of the I/O device 12. Optical fibers 40, 42, and 44 respectively are then cleaved on one end to form a cleaved facing plane surface. Next, the optical fibers 40, 42, and 44 are respectively bonded onto the etched groove of each of the fiber carriers 34, 36, 38 such that the planes of the optical fiber cleaved facing surfaces lie roughly in the planes of carrier auxiliary surfaces 46, 48, and 50, respectively. The bonding material between the optical fiber and the fiber carrier may be, without limitation, a commercially available optical adhesive such as Norland 61 or Norland 81. After the bonding of the optical fiber to the fiber carrier, the fiber carriers 34, 36, and 38 are mounted to the device mounting surfaces 22 and 24 respectively so that the optical fiber cleaved facing surfaces lie in registration with the waveguide ports. The carrier auxiliary surfaces 46, 48, and 50, having (by way of example and not limitation) a thin layer of UV sensitive optical adhesive on their surface which are then placed in contact with the waveguide ports in the device mounting surfaces 22 and 24 such as shown in FIG. 1. The registration may be done by conventional means of alignment. Or, a light signal of known intensity and power may be presented to the waveguide port in contact with the optical fiber while a detector mounted on the other waveguide port measures the output intensity/power. The fiber carrier device may then be aligned until the maximum output intensity/power is measured by the device. At that point, an ultraviolet light is projected onto the carrier auxiliary surface which bonds the carrier auxiliary surface to the device mounting surface which mounts the fiber carrier to the I/O device.

Figure 2B:
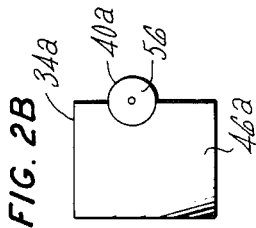
FIG. 2B is a side view illustration of a fiber carrier similar to the fiber carrier 34 of FIG. 1 except modified to eliminate back reflection.
Figure 2A:
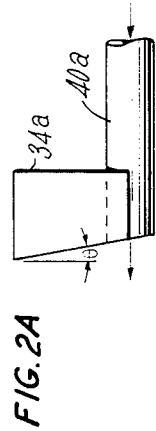
FIG. 2A is a top view illustration of a fiber carrier similar to the fiber carrier 34 of FIG. 1 except modified to eliminate back reflections.

FIGS. 2A and 2B are top and side views of a carrier 34a similar to the carrier 34 of FIG. 1 except that both the carrier auxiliary surface and the device mounting surface are ground at an angle with respect to the horizontal and then polished to eliminate the backreflection of light at the optical fiber-waveguide interface. In the top view of FIG. 2A, the fiber carrier 34a and an optical fiber 40a have been ground at an angle theta 54. For the fiber carrier auxiliary surface an adequate angle for minimizing the reflected light back into the optical fiber has been found, through repeated testing, to be an approximately 10° cut along the auxiliary surface. The side view of the fiber carrier 34a in FIG. 2B clearly shows a carrier auxiliary surface 46a along with a fiber carrier cleaved surface 56.

Figure 3:
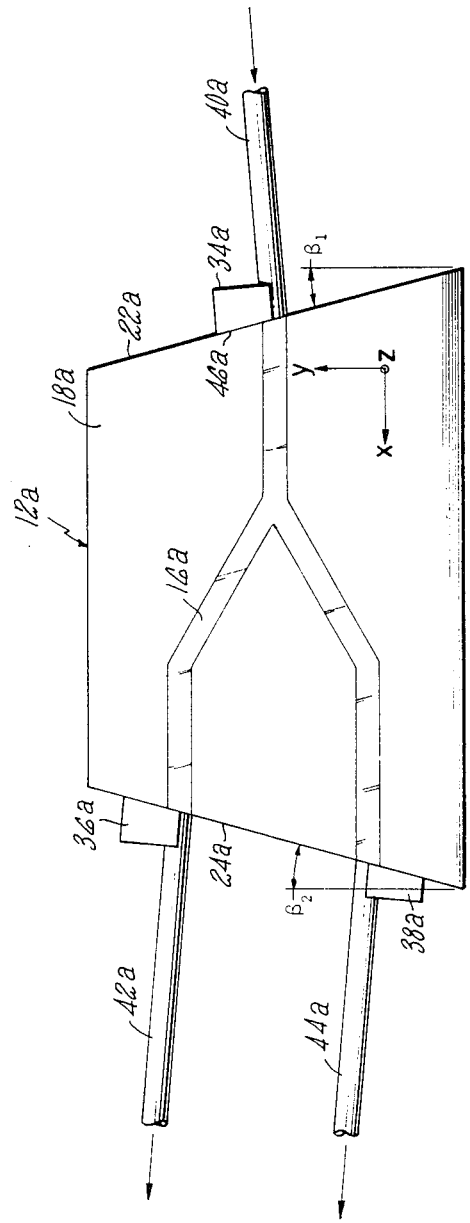
FIG. 3 is a top view illustration of several fiber carriers mounted on an I/O device, according to the present invention.

FIG. 3 shows a top view of an I/O device 12a having two mounting surfaces 22a and 24a and a waveguide 16a formed within a crystal surface 18a. Fiber carriers 34a, 36a, and 38a are manufactured and the optical fibers 40a, 42a, and 44a are aligned and mounted onto the mounting surface of the respective fiber carriers in the same manner as previously discussed. Furthermore, the auxiliary surfaces of the fiber carriers are cut and polished to form the previously discussed 10° angle. In FIG. 3, the I/O device mounting surfaces 22a, 24a are ground and polished to form an angle $\beta_1$ and $\beta_2$ of approximately 15° to reduce and minimize the back reflection of light back into the waveguide.

At this point, several important points are worth noting. First, although a Cartesian coordinate system has been used to define the atomic structure of the I/O device and the fiber carrier, the present invention should in no way be limited to the use of a Cartesian coordinate system to define the atomic structure. The use of a right-handed Cartesian coordinate system was for illustrative purposes and one skilled in the art will know of many other conventions to describe the crystalline structure of the fiber carrier and the I/O device. Second, although shown as a rectangular structure, the fiber carrier and the I/O device should not be limited to a particular shape. One skilled in the art would choose a particular shape for the fiber carrier or the I/O device dependent on the constraints and requirements of the specific application. So long as the I/O device and fiber carrier optic axes are parallel, the shape of the I/O device, the shape of the fiber carrier, and the orientation of their atomic structures with respect to those shapes are totally independent of the invention and are therefore application dependent. Finally, although described as a hexagonal unit cell in this application, the materials used should in no way be limited to the use of the hexagonal unit cell to define their crystalline structure. The use of the hexagonal unit cell in this application was for illustrative purposes only. One skilled in the art will know of many other unit cells to describe the crystalline structure of the materials described. For example, lithium niobate and similar materials can also be described as a rhombohedral unit cell or as a member of the perovskite family, specifically a deviated perovskite.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. A method of joining an optical fiber to a light port in a mounting surface of an integrated optical (I/O) device having an anisotropic thermal expansion property along a known optic axis, which is one of three orthogonal axes, comprising the steps of:

positioning a fiber carrier, having an anisotropic thermal expansion property along a known optic axis which is one of three orthogonal axes, with the I/O device such that said carrier optic axis is parallel to the device optic axis and such that an auxiliary surface of said carrier is parallel to the device mounting surface, said fiber carrier having a substantially similar anisotropic thermal expansion property along its optic axis as that of the I/O device;

bonding an optical fiber which has been cleaved on one end to form a cleaved facing surface to said fiber carrier so that the plane of said cleaved surface substantially lies in the plane of said auxiliary surface;

placing said cleaved surface in registration with the light port; and bonding said carrier auxiliary surface to the device mounting surface.

2. The method of claim 1, further comprising the step of:

aligning said carrier mounting surface with the device mounting surface such that said carrier optic axis is the only one of said three orthogonal axes which is parallel to said three orthogonal axes of the I/O device.

3. The method of claim 1, wherein said step of placing further comprises the steps of:

transmitting a light signal across the interface between the optical fiber and the light port;

detecting the magnitude of said light signal after transmission across said interface; and realigning the optical fiber with the light port to maximize said detected magnitude of said transmitted light signal.

4. The method of claim 3, wherein said step of bonding comprises the step of ultraviolet bonding of said carrier auxiliary surface to the device mounting surface when the magnitude of said transmitted light signal is maximized.

5. An integrated optic (I/O) system, comprising:

an optical fiber which has been cleaved on an end to form a cleaved facing surface;

an integrated optical (I/O) device having a light port on a mounting surface and an anisotropic thermal expansion property along a known optic axis which is one of three orthogonal axes;

as characterized by:

a fiber carrier having an anisotropic thermal expansion property along a known optic axis which is one of three orthogonal axes and which is both parallel in direction to and substantially similar in magnitude to said anisotropic thermal expansion property of said I/O device, said fiber carrier having an auxiliary surface which is parallel to said device mounting surface, said fiber carrier also having said optical fiber bonded to said fiber carrier so that the plane of said optical fiber cleaved facing surface lies substantially in the plane of said carrier auxiliary surface, and said fiber carrier further having said carrier auxiliary surface for bonding said fiber carrier to said device mounting surface so that said cleaved facing surface lies in registration with said light port.

6. The apparatus in claim 5, wherein said carrier optic axis is the only one of said three orthogonal axes which is parallel to said three orthogonal axes of said I/O device.

* * * * *